(No Model.)

W. A. GAY.
OZONE GENERATOR.

No. 287,760. Patented Oct. 30, 1883.

Witnesses.

W. Alfred Gay, Inventor.
By Wilhelm & Bonner
Attorneys.

UNITED STATES PATENT OFFICE.

WILLIAM A. GAY, OF TONAWANDA, ASSIGNOR OF ONE-HALF TO JOHN OTTO, OF BUFFALO, NEW YORK.

OZONE-GENERATOR.

SPECIFICATION forming part of Letters Patent No. 287,760, dated October 30, 1883.

Application filed July 17, 1883. (No model.)

*To all whom it may concern:*

Be it known that I, WILLIAM ALFRED GAY, of Tonawanda, in the county of Erie and State of New York, have invented new and useful Improvements in Ozone-Generators, of which the following is a specification.

It has long been known that pure ozone exerts a beneficial effect upon the atmosphere, and that it acts as a powerful purifier and disinfectant; but it has not been employed so far to any considerable extent, because of the cost of manufacturing pure ozone, and because ozone as ordinarily produced is mixed with injurious gases, which are highly objectionable.

The object of my invention is to produce an ozone-generator by which pure ozone can be produced in a simple manner at small expense by the slow oxidation of phosphorus, and by which the ozone is completely freed from all deleterious gases.

My invention consists of the improvements in the construction of the generator, which will be hereinafter fully set forth, and pointed out in the claims.

Figure 1:
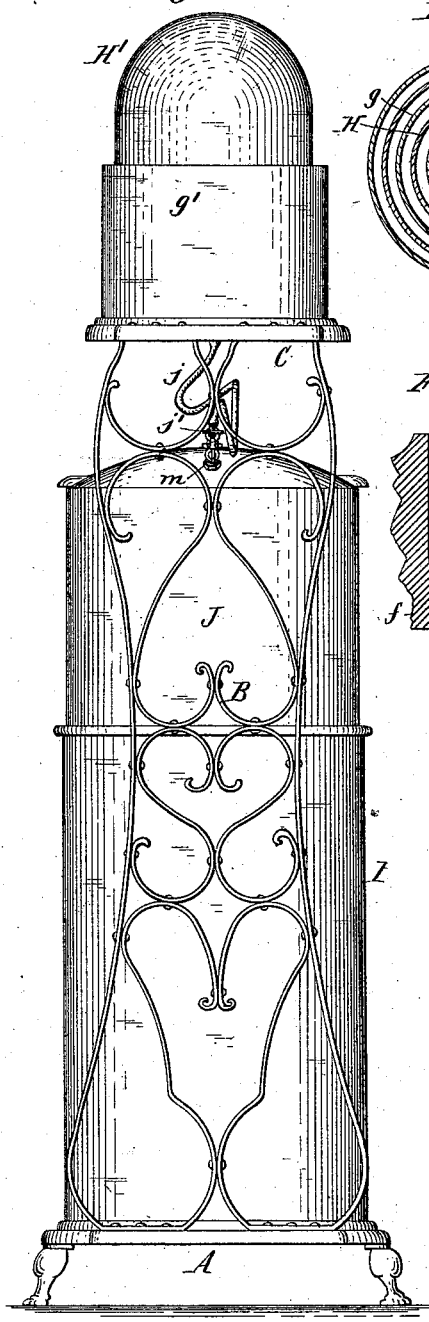
Figure 3:
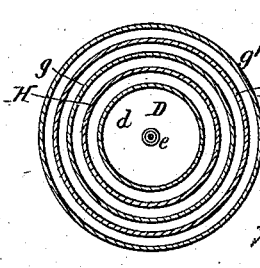
Figure 2:
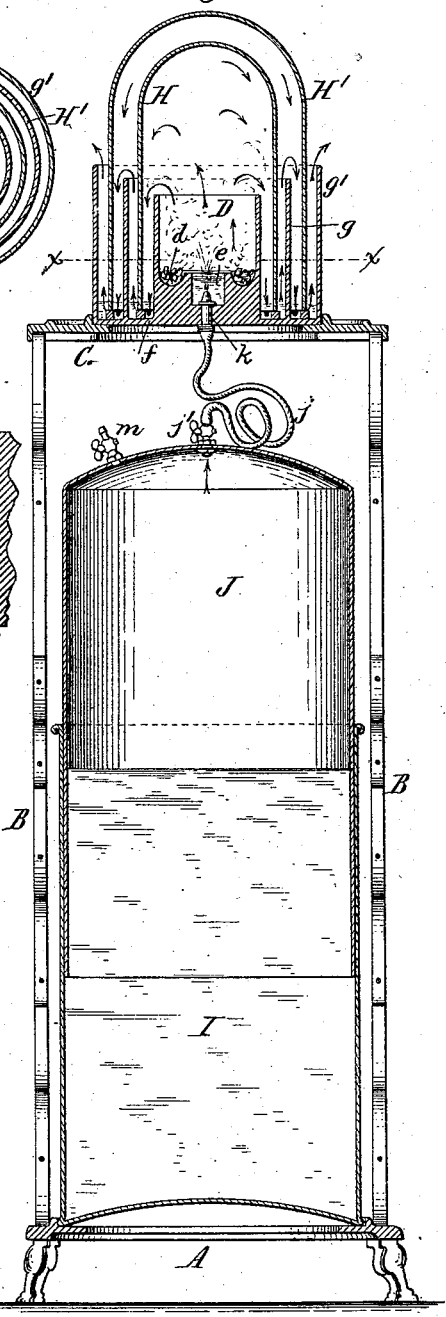
Figure 4:
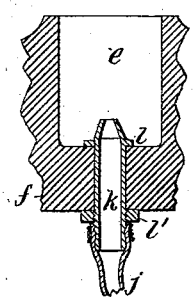

In the accompanying drawings, Figure 1 is a side elevation of my improved ozone-generator. Fig. 2 is a vertical section at right angles to Fig. 1. Fig. 3 is a horizontal section in line $x\,x$, Fig. 2. Fig. 4 is a vertical section of the air-nozzle on an enlarged scale.

Like letters of reference refer to like parts in the several figures.

A represents the base frame of the apparatus, and B B the side frames, resting on the same. C is the top frame, secured to the upper ends of the side frames, B, and supporting the generating and purifying apparatus. This apparatus is composed of the following parts:

D represents the inner vessel, in which the phosphorus is placed. This vessel is preferably cylindrical in form, open at the top, and provided with a phosphorus-holder, $d$, having the form of a shallow annular cup.

$e$ represents the air-tube, which is arranged centrally in the vessel D, and which extends from the base-plate $f$ of said vessel to the phosphorus-holder $d$.

$g\,g'$ represent upwardly-projecting rims, arranged concentric with the inner vessel, D, and formed on the same base-plate, $f$, with said vessel, at suitable distances apart.

H represents an inverted globular or cylindro-globular cover, arranged with its lower cylindrical portion between the vessel D and the rim $g$, and extending over the vessel D so as to inclose the same.

H' represents a similar cover, arranged with its lower portion between the rims $g$ and $g'$, and extending over the cover H so as to inclose the latter.

I represents a water-vessel, preferably cylindrical in form, and arranged upon the base-frame A; and J is an air-vessel fitting loosely in the vessel I, and provided at its top with a flexible air-pipe, $j$, having a stop-cock, $j'$, and leading to an air-nozzle, $k$, which opens into the air-tube $e$ of the generator. The nozzle $k$ is preferably made of glass, with an annular shoulder or flange, $l$, resting against the upper side of the base-plate $f$, and secured on the under side of the same by a screw-nut, $l'$. The air-vessel J and water-vessel I constitute together an air-holder or gasometer, which can be filled with air through an opening in the top of the vessel J, provided with a stop-cock, $m$, by opening the latter, closing the stop-cock $j'$ of the air-pipe, and lifting the vessel J in the vessel I until its lower edge has nearly reached the water-level in said vessel. Upon closing the stop-cock $m$ the air is confined in the vessel J, and upon opening the stop-cock $j'$ the air is expelled from the vessel through the pipe $j$ by the weight of said vessel. The outflow of the air is regulated by the stop-cock $j'$.

The vessel D is filled with water to a height at which only the extreme upper portions of the sticks of phosphorus placed in the holder $d$ are uncovered by water. The air-tube $e$ is consequently filled with water at all times, or it may be filled with absorbent material saturated with water. The air issuing from the nozzle $k$ rises through the water in the tube $e$ and becomes moist in its passage through the water contained in the tube, so that the atmosphere which fills the inner vessel, D, and globe H is always moist, which is the most desirable condition for generating ozone, a mist or an excess of moisture being as objectionable as dry air. The ozone which is generated by the slow oxidation of the phosphorus in this moist atmosphere is mixed with phosphoric acid, which is separated from the ozone by passing the gases through water or absorbent material saturated with water. The covers H H' rest upon wet sponges or other absorbent material saturated with water and placed in the spaces between the vessel D and the rims $g\ g'$, or the lower edges of the covers rest upon blocks placed in said spaces on the base-plate $f$, so as to form openings below the lower edges of said covers for the passage of the gases, and the spaces surrounding the lower edges of the covers are filled with water to a suitable height. The pressure of the air in the vessel J causes a movement of the gases through the generating apparatus in the direction of the arrows in Fig. 2. The gases rise in the vessel D and under the cover H, descend between the vessel D and the inner side of the cover H, pass through the water or moist absorbent material at the lower edge of the cover H, rise between the outer side of the cover H and the rim $g$ and under the cover H', descend between the inner side of the cover H' and the rim $g$, pass through the water or moist absorbent material at the lower edge of the cover H', rise between the cover H' and the rim $g'$, and finally escape into the surrounding atmosphere. In passing through the water or moist absorbent material at the lower edges of the covers H H', the ozone is freed from the accompanying phosphoric acid, the latter becoming dissolved in the water, while the purified ozone, which is not soluble in water, escapes into the surrounding air.

The oxidation of the phosphorus and the consequent generation of ozone are easily regulated by the stop-cock $j'$, and can be arrested at any time by closing said cock.

The number of covers inclosing the generating-vessel D may be increased, if necessary, to secure a complete purification of the ozone.

My improved generator is very simple in construction, easily understood and manipulated, and produces pure ozone at a reasonable cost.

The generator may be placed in a vessel fitted tightly to the generator, and provided with a suitable pipe or conduit, whereby the ozone is conducted to the compartment or room in which it is to be used.

I claim as my invention—

1. The combination, in an ozone-generator, of a generating-vessel adapted to hold phosphorus, an apparatus whereby air is forced into the generating-vessel, and a water-chamber through which the air is caused to pass before it reaches the phosphorus placed in the generating-vessel, substantially as set forth.

2. The combination, with an ozone-generating vessel, of an air-holder composed of a stationary water-vessel and a movable air-vessel, and a pipe whereby the air is conducted from said holder to the generating-vessel, substantially as set forth.

3. The combination, with the phosphorus-holder, of a cover, H, inclosing the phosphorus-holder, a water-chamber in which said cover is seated, a water-sealed gas-escape passage formed in said water-chamber at the lower edge of said cover, and a chamber or passage surrounding the cover and receiving the gas as it escapes around said cover from said water-sealed passage, substantially as set forth.

4. The combination of the inner vessel, D, having an annular phosphorus-holder, $d$, and a central chamber, $e$, extending downwardly from said phosphorus-holder, of an air-supply pipe opening into the chamber $e$, and a cover, H, inclosing the phosphorus-holder, substantially as set forth.

5. The combination, with a cover, H, of an inner vessel, D, having a phosphorus-holder, $d$, air-pipe $e$, nozzle $k$, air-holder I J, and pipe $j$, substantially as set forth.

WM. ALFRED GAY.

Witnesses:
 EDWARD WILHELM,
 CHAS. F. GEYER.